April 2, 1940.  T. BROWN  2,196,053
POWER LIFT MECHANISM
Original Filed April 2, 1938   3 Sheets-Sheet 1
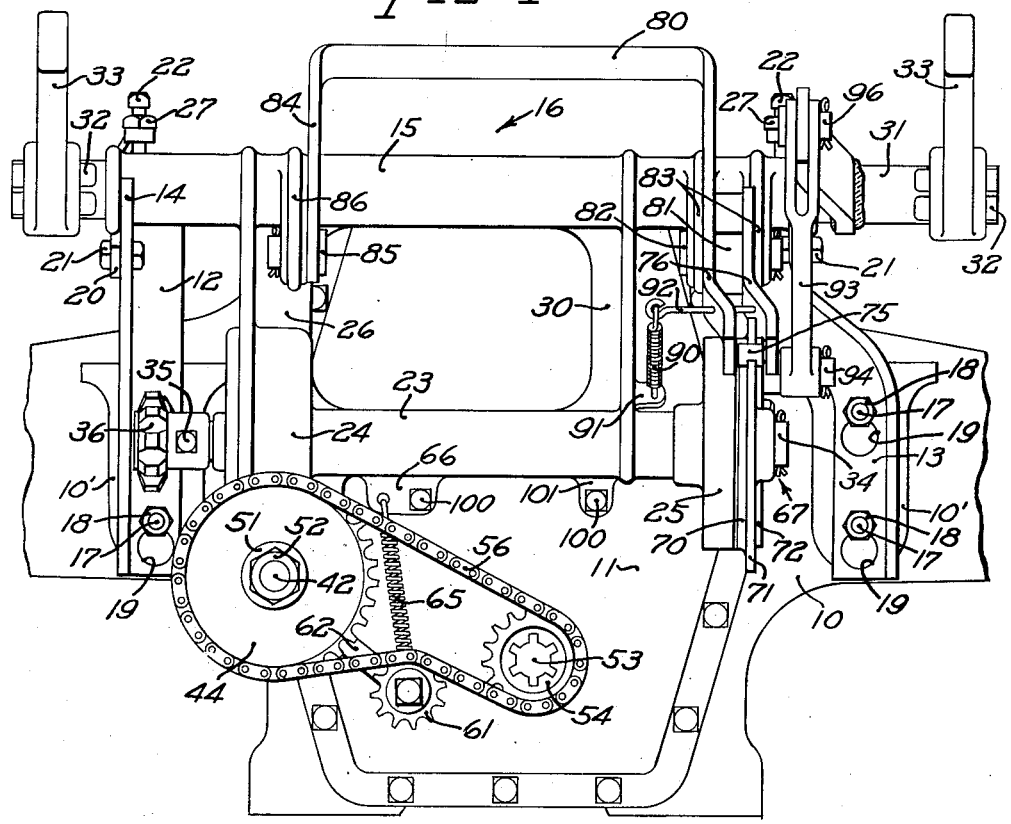
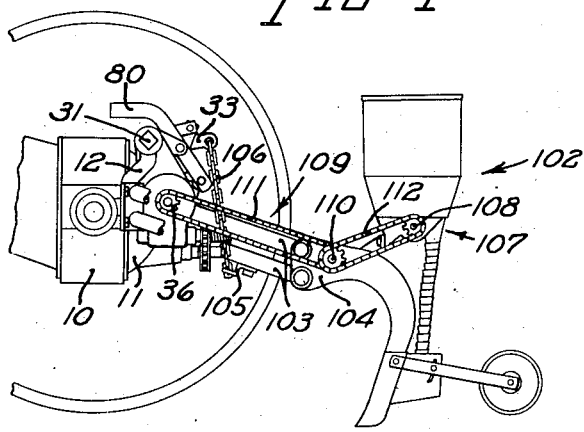
INVENTOR.
THEOPHILUS BROWN
BY
ATTORNEY April 2, 1940.　　　　T. BROWN　　　　2,196,053

POWER LIFT MECHANISM

Original Filed April 2, 1938　　　3 Sheets-Sheet 2

INVENTOR.
THEOPHILUS BROWN

BY C.T. Parker
ATTORNEY

April 2, 1940.                T. BROWN                     2,196,053
                        POWER LIFT MECHANISM
              Original Filed April 2, 1938     3 Sheets-Sheet 3
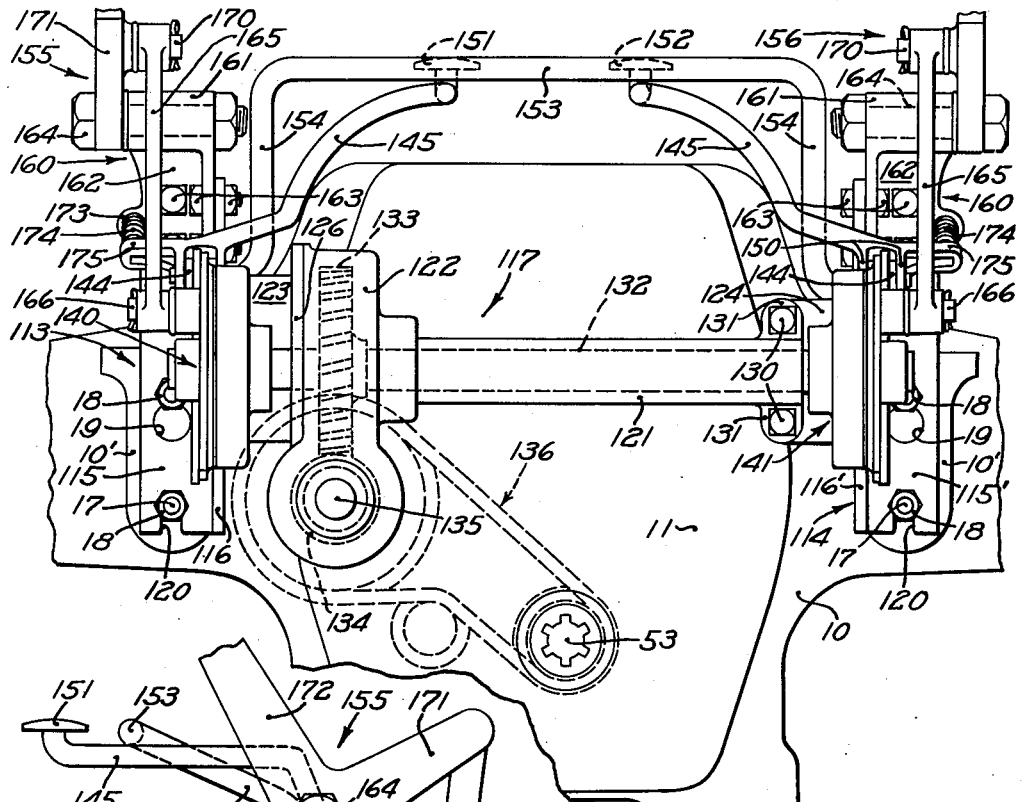
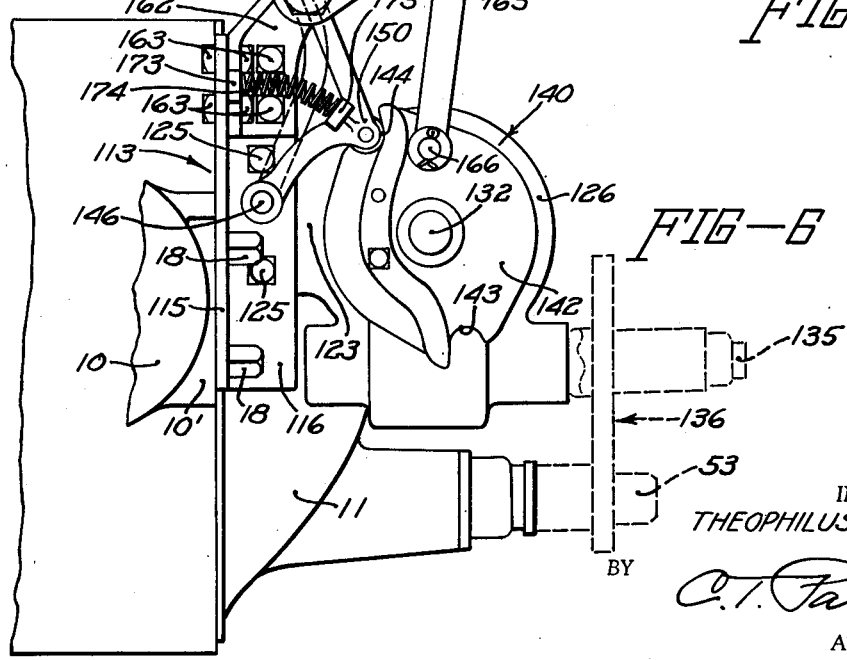
INVENTOR.
THEOPHILUS BROWN
BY
C. T. Parker
ATTORNEY Patented Apr. 2, 1940

2,196,053

UNITED STATES PATENT OFFICE 2,196,053

POWER LIFT MECHANISM

Theophilus Brown, Moline, Ill., assignor to Deere & Company, Moline, Ill., a corporation of Illinois Application April 2, 1938, Serial No. 199,681
Renewed August 21, 1939

22 Claims. (Cl. 97—50)

The present invention relates to power lift mechanism for tractors and the like and has for its principal object the provision of a simple and compact power lift unit that is readily attachable and detachable for use on tractors which are not provided with a built-in power lift mechanism. More specifically, it is my object to provide a unitary power lift unit which can be readily attached to such a tractor, employing supporting and driving means which are adapted to cooperate with the usual implement supporting and driving connections, furnished as standard equipment on most tractors. In the accomplishment of this object, I provide a pair of brackets which are adapted to be fixed to implement mounting bosses formed on the rear face of the tractor axle housing and which carry the rock shaft and housing containing the power lift mechanism. The primary function of the aforesaid brackets is to support the weight of the power lift attachment and load lifted thereby, and in one of the two embodiments shown and described herein, the tendency of the power lift housing to swing about the axis of the rock shaft during lifting operations is resisted by a stop or abutment which bears against the tractor axle housing. In order to accommodate the power lift housing to irregularities in the surface of the tractor axle housing, and to provide for properly aligning the power transmission driving and driven members, the power lift housing is made rockable about a transverse axis so that the angular relation between the power lift and axle housings can be changed, while the aforementioned stop comprises a set screw in threaded engagement with a lug formed on the power lift housing. Since practically all modern tractors are provided with a projecting splined power take-off shaft as standard equipment, my invention contemplates using this as the source of power. Accordingly, a splined sprocket readily attachable to the power take-off shaft is employed, with a chain drive to transmit power to the lifting mechanism.

Another object of the present invention is to provide a power lift attachment adapted to be mounted on the implement mounting means of tractors, employing a pair of lifting units driven by the implement driving means and capable of independent or simultaneous operation, at option.

These and other objects and advantages of the present invention will become apparent after a consideration of the following detailed description of the preferred structural embodiment, reference being had to the accompanying drawings, in which:

Figure 1 is an elavational view of my improved power lift attachment mounted on the rear axle housing of a tractor;

Figure 2:
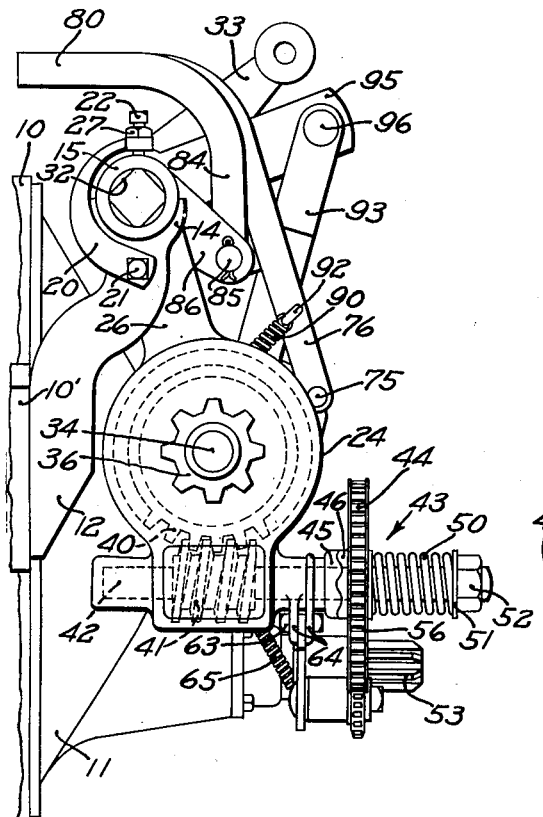
Figure 2 is a left side view of the construction shown in Figure 1, with the near lifting arm removed to show certain details more clearly, and a portion of the gear drive shown in dotted lines.
Figure 3:
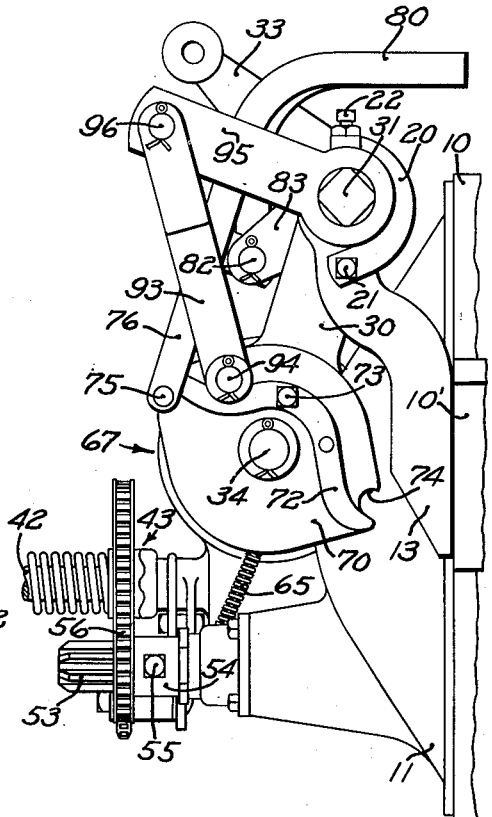
Figure 3 is a right side view of the same structure, also with the near lifting arm removed.

Figure 4 is a side view, drawn to reduced scale, of a portion of a tractor with attached power lift mechanism and a planting implement, showing the manner of connection between the lifting mechanism and implement as well as the driving connection between the auxiliary power take-off driving member and the implement planting mechanism, the near tractor wheel as well as various other parts of the power lift mechanism and implement being removed or omitted for the sake of clarity;

Figure 5 is a rear elevation of another embodiment of the present invention, in which two lifting units are employed and in which the structural form of the housing and supporting brackets has been modified; the sprocket and chain transmission drive being identical to that shown in Figures 1, 2 and 3 and therefore indicated only diagrammatically here; and Figure 6 is a side elevation of the embodiment shown in Figure 5.

Referring now to the drawings and more particularly to Figures 1 to 4, inclusive, the numeral 10 indicates a banjo type axle housing containing the rear axle and differential mechanism of a more or less conventional tractor, and closing the usual rear opening is a cover plate 11. As is customary in most present day tractors, the back side of the axle housing 10 is provided with laterally spaced, rearwardly facing implement mounting bosses 10' disposed generally symmetrically on opposite sides of the cover plate 11, to which brackets, draft connections, and other suitable complementary connecting means associated with various detachable implements may be bolted or otherwise suitably secured. In the embodiment illustrated herein, the power lift attachment comprising the present invention is mounted on the bosses 10' by means of two vertically extending angle iron brackets 12 and 13, the latter of which is curved inwardly to avoid certain operating mechanism as will readily be seen in the drawings. Preferably, although not necessarily, the manner of connecting the brackets 12, 13 to the bosses 10' is similar to that described in detail in the co-pending application of Theophilus Brown and Talbert W. Paul, Serial No. 183,067, filed January 3, 1938, in which stud bolts 17 are screwed into vertically spaced threaded recesses in each of the bosses 10' and provided on their outer ends with hexagonal or other suitably shaped cap nuts 18. The brackets 12 and 13 are provided with vertically extending keyhole slots having a lower circular portion 19 of sufficiently large diameter that will permit the cap nuts 18 to pass through such portion, and an upper generally rectangular shaped portion of reduced width communicating with and extending upwardly from the portion 19 to receive the shank of the stud bolt 17.

It will be seen from the above that in order to install the supporting brackets 12 and 13 on the rear axle housing it is only necessary to unscrew the cap nuts 18 on the studs 17 to move them away from the boss a sufficient distance to permit the bracket to be inserted between such cap nuts and the boss, and then the bracket can be slipped over the cap nuts 18 and dropped into place on the studs 17, after which the cap nuts are drawn up on the studs 17 to clamp the brackets 12 and 13 securely in place against the faces of the bosses 10'.

The upper end of each of the bracket members 12, 13 is provided with a socket portion 14, and cradled in these sockets is the transversely extending upper tubular portion 15 of a mechanism housing, indicated in its entirety by the reference numeral 16. The brackets 12 and 13 are each provided with a clamp comprising a curved link 20 which is swingably connected to its respective bracket by a pivot bolt 21. A bolt 22 in threaded engagement with the free end of the link 20 is adapted to be clamped down against the top surface of the tube 15 to hold the latter down into the sockets 14, while a lock nut 27 serves to hold the bolt 22 against loosening. Disposed below the tube 15 and parallel thereto is a second shorter tube 23, the left end of which terminates in a gear case 24 and the right end of which terminates in a clutch housing 25. Interconnecting the two tubular portions 15 and 23 are two arms 26 and 30 which are formed integrally with the tubes 15 and 23 providing a strong and rigid housing to hold the mechanism to be described hereinafter.

Journaled within the transversely extending tube 15 is a rock shaft 31, the ends of which project laterally outward beyond the ends of the tube 15 and are squared, as at 32, to engage a square aperture formed in the hub of a lifting arm 33. Journaled in the lower tube 23 is another transverse shaft 34 which also extends beyond the ends of the tube, and fixed on the left end of the shaft 34 by means of a set screw 35 is a sprocket 36, the purpose of which will be disclosed later.

As previously stated, the left end of the tube 23 terminates in a gear case 24, and fixed on the shaft 34 within this gear case is a worm gear 40, as shown in dotted lines in Figure 2. Disposed below the gear 40 in driving relation therewith is a worm 41 fixed on a shaft 42 which is suitably journaled in the gear case 24 and projects rearwardly therefrom. Driving the shaft 42 through a conventional slip clutch 43 is a sprocket 44 disposed on the rear end of the shaft 42 and adapted to receive power from the tractor power take-off shaft in a manner to be described shortly. Preferably, although not necessarily, the slip clutch 43 comprises a pair of companionate serrated collars 45 and 46, the first of which is fixed to the shaft 42 and the other of which is fixed to the adjacent face of the sprocket 44 which is journaled on the shaft 42. A compression spring 50 bearing against a retaining washer 51 and lock nut 52 threaded on the end of the shaft 42, holds the sprocket and collar 46 against the collar 45 with sufficient force to resist any tendency for relative movement between the two elements under normal load. When overloaded, however, as by attempting to lift too heavy an implement or when the implement lifting means become jammed, the forces set up by the co-acting surfaces of the serrated collars 45, 46 exceed the force exerted by the spring 50 causing the sprocket 44 to rotate on the shaft 42 and at the same time slide back and forth thereon as the collar 46 rides over the high points on collar 45.

In the conventional tractor as illustrated herein, the power take-off shaft comprises a splined shaft 53 projecting rearwardly from a suitable housing disposed substantially centrally in the lower portion of the cover plate 11, and engaging the splines of the shaft 53 is a sprocket 54. The latter is quickly and easily slipped on or off the power take-off shaft 53 and is held in position thereon by means of a set screw 55 which is in threaded engagement with the hub of the sprocket 54. A driving chain 56 is trained over sprockets 44 and 54 and held tight by a chain tightener comprising a sprocket 61 journaled on an arm 62 which is swingably connected by a pivot bolt 63 to a bracket 64 formed on the gear case 24 and yieldingly held against the chain 56 by a tension spring 65. The latter is hooked at its other end through an aperture in a lug 66 formed on the under side of the tube 23.

Disposed within the clutch housing 25 is a self-interrupting, half-revolution type clutch 67 of conventional design well known to those skilled in the art and therefore not shown in more detail here. Briefly, the clutch 67 comprises a driving member (not shown) which is fixed to the normally rotating shaft 34; a driven member 70 journaled on the shaft 34 and having a radially extending flange 71 disposed on the outside of the clutch housing 25; and means for optionally engaging and automatically disengaging the driving and driven clutch members after a half revolution together. The last named means includes suitable mechanism carried on the clutch driven member 70 within the housing 25 for locking the driving and driven members together and is actuated by a lever arm 72 which is pivotally connected to the driven member 70 by a pivot bolt 73 and with its ends positioned adjacent a pair of 180° spaced notches 74 formed in the flange 71 in a manner best illustrated in Figure 3. A roller 75 which is normally seated in one or the other of the notches 74 bears against the lever arm 72 disabling the locking mechanism within the clutch until the roller is lifted out of its seat in the notch, at which time the clutch is engaged causing the driven member 70 and attached lever arm 72 to rotate through 180°. As the succeeding notch 74 comes around into position, the roller 75 drops into seating engagement with it, thereby disabling the locking mechanism once more.

The roller 75 mentioned previously is carried between and journaled in the ends of a pair of spaced parallel members 76 which extend upwardly and forwardly therefrom to form the right leg of a U-shaped trip bar 80. Welded between the members 76 a short distance above the roller 75 is a block 81 which extends downwardly and forwardly and is pivotally connected by a pin 82 to a pair of bracket lugs 83 formed on the back side of the tube 15. One of the leg members 76 curves forwardly up over the tube 15 where it is bent to form the transverse portion of the trip bar 80 within easy reach of either foot of the tractor operator. The left leg 84 of the trip bar 80 is likewise curved downwardly and pivotally connected by a pin 85 to a lug 86 formed on the back side of the tube 15, the pin 84 being disposed in axial alignment with pin 82. A tension spring 90 fastened at one end to a lug 91 formed on the side of the housing arm 30 and hooked at the other end through the eye of an eye bolt 92 which is passed through aligned holes in the members 76 between the pin 82 and roller 75 exerts a yielding force against the trip bar 80 to hold the roller 75 against the flange 71.

Transmitting the lifting force from the clutch 66 to the rock shaft 31, is a link 93 the lower end of which is journaled on a crank 94 projecting laterally from the clutch driven member 70. The upper end of the link 93 is bifurcated to receive a lever arm 95 which is fixed as by welding to the rock shaft 31, and the lever arm 95 and link 93 are swingably connected by a pin 96 passed through aligned apertures in the two members. Thus it will be seen that the operation of the clutch 66 causes the rock shaft 31 to be rocked between two terminal positions in which the lifting arms 33 are raised or lowered.

In mounting the power lift attachment on a tractor, the first step is to secure the bracket members 12 and 13 onto the rear axle housing. The clamp links 20 are then swung downwardly out of the way and the housing lifted up onto the brackets and seated in the socket portions 14. The sprocket 54 is then slipped over the splined power takeoff shaft 53 and the chain 56 trained over both sprockets. If it is found that the two sprockets 44 and 54 cannot be made to lie in the same plane due to improper contact of the housing 16 against the cover plate 11, the lower tube 23 can be moved forwardly or rearwardly relative to the upper tube 15 by means of adjusting screws 100 which are in threaded engagement with lugs 66 and 101 formed on the under side of the tube 23, and which bear against the cover plate 11. Turning the adjusting screws 100 in causes the lower tube 23 to move rearward relative to the upper tube 15, changing the angle of the plane of the sprocket 44 and making it possible to align both sprockets 44 and 54 in the same plane. When the sprockets have been properly aligned, sprocket 54 is clamped in position on the power takeoff shaft 53 through the agency of the set screw 55, and the chain tightener sprocket 61 is engaged with the under side of the lower run of the chain 56. At this point the links 20 are swung up into position and clamped down upon the upper tube 15 with sufficient force to prevent any tendency of the housing 16 to swing back and forth when not under load.

Figure 4 illustrates one application of my power lift attachment in which a tractor mounted planter, indicated generally by the reference numeral 102, utilizes both the lifting mechanism and power take-off drive. Draft connection between the planter 102 and tractor comprises two laterally spaced pairs of parallel links 103 which are swingably connected at their front ends to brackets fixed on the outer ends of the rear axle housing and at their rear ends to a bracket member 104 comprising the forward end of the planter standard. A transverse bar 105 extending between and suitably fixed to the two lower links 103 is connected by chains 106 to the two lifting arms 33. The planting mechanism indicated at 107 is actuated by a drive shaft 108 and the latter is provided with a sprocket fixed thereto which is driven through chain transmission 109 and countershaft 110 from the power take-off driving sprocket 36. The countershaft 110 extends transversely between the planter bracket members 104 and is journaled therein in the same position relative to the rear ends of the links 103 as is the sprocket 36 relative to the front ends of the links 103 so that the distance between the sprocket 36 and countershaft 110 remains constant regardless of the vertical movement of the planter 102 relative to the tractor. A chain 111 trained over sprocket 36 and a sprocket fixed on the shaft 110 drives the latter, while a chain 112 transmits power from the countershaft 110 back to the drive shaft 108.

Figures 5 and 6 show another embodiment of the present invention employing two lifting clutches which are operable independently or simultaneously, at option, together with a modified housing and supporting structure.

As in the previously shown embodiment, the power lift attachment comprises a housing 117 in which is contained operating mechanism driven by power derived from the power take-off shaft of the tractor, said housing being connected to suitable implement mounting means provided on the rear axle housing of the tractor through the agency of two laterally spaced, upright angle iron brackets 113 and 114. Each of the brackets 113, 114 is made up of two perpendicularly disposed flanges; bracket 113 comprising flanges 115 and 116, and bracket 114 comprising flanges 115' and 116'. Flanges 115 and 115' are adapted to be clamped to the faces of bosses 10', and to this end each is provided about midway of its length with a vertically extending keyhole slot identical to those formed in bracket members 12 and 13 of the embodiment shown in Figure 1. The lower ends of the flanges 115, 115' differ from the first shown embodiment, however, in that each is provided with an open ended vertically extending slot 120 that is adapted to fit over the lower stud bolt 17 behind its cap nut 18, such construction facilitating mounting and demounting of the attachment under certain conditions.

The housing 117 consists of a transverse tubular member 121 which is provided at its left end with a gear case 122, and is attached to brackets 113 and 114 by means of two connecting members 123 and 124. Preferably, although not necessarily, member 123 is made up as a casting, being provided with a flange portion adapted to be fixed to the inner side of flange 116 as by bolts 125, and a cover plate portion 126 adapted to cooperate with the open end of the gear case 122. Member 124 is likewise fixed to flange 116' in any suitable manner and is secured to lugs 131 provided at the right end of the tube 121 by means of bolts 130. Disposed within the tubular portion 121 and journaled in suitable bearings therein is a shaft 132 to which is fixed a worm gear 133. A rearwardly extending shaft 135 having an integral worm 134 is journaled in the housing 117 below the gear 133 and operatively engaged therewith to drive the latter; shaft 135 being driven, in turn, from the power take-off shaft 53 through a sprocket and chain drive and a slip clutch, indicated diagrammatically at 136, which are identical to those shown in greater detail in Figures 1, 2 and 3.

Disposed at opposite ends of the shaft 132 are two self-interrupting lifting clutches 140 and 141 similar to the clutch 67 described in the embodiment shown in Figures 1, 2 and 3, and each having a flanged driven member 142 provided with notches 143 in one of which the actuating roller 144 is normally seated. As previously explained, unseating the roller from its socket initiates the operation of the clutch, causing the driven member to be rotated through substantially one half revolution, at which point the mechanism automatically disengages the clutch driving and driven members. Each of the rollers 144 is carried in a trip lever 145 which is pivotally connected by a pin 146 to the outer side of flanges 116 and 116', respectively, and extends upwardly and rearwardly therefrom to a bifurcated supporting member 150, in which the roller 144 is journaled. From the supporting member 150, the levers 145 curve forwardly, upwardly, and inwardly, terminating in a pair of foot pedals 151 and 152 which are disposed side by side within easy reach of the operator's feet. Depressing the left pedal 151 operates the left clutch 140, and likewise, depressing the right pedal 152 operates the right clutch 141. Means have also been provided for operating both clutches simultaneously with either foot, comprising a bail having a transverse portion 153 disposed above and resting upon the forwardly extending portion of both trip levers 145, and a pair of downwardly bent legs 154 which are pivotally connected at their ends by pins 146 to the inner sides of flanges 116 and 116', respectively. Thus it will be seen that by stepping upon the transverse bar 153 at any point along its length, both trip levers 145 are depressed, causing simultaneous operation of both lifting clutches 140 and 141.

The lifting force exerted by the clutches 140 and 141 is applied to two bell cranks 155 and 156 which are rockably supported in bearing blocks 160 fixed to the upper ends of the brackets 113 and 114. Each of the bearing blocks 160 comprises a transverse sleeve portion 161 and a downwardly and forwardly extending bracket portion 162 having two perpendicularly disposed flanges which are adapted to fit up against the flanges 115, 116 and 115', 116', respectively, and are bolted thereto by bolts 163. A pin bolt 164 is passed through aligned apertures in each of the bell cranks 155, 156 and their respective sleeves 161, provided bearing means upon which the bell cranks are free to rock independent of each other. A link 165 which is pivotally connected at one end to a crank 166 on the clutch driven member 142, and at the other end to a pin 170 extending laterally inward from the end of one of the bell crank arms 171, provides the connecting and power transmitting means between each of the clutches 140, 141, and their respective bell cranks 155, 156. A second bell crank arm 172 extending generally upward at substantially a right angle to arm 171 is adapted to operate lifting means on forwardly mounted cultivator rigs or other implements carried on the tractor frame ahead of the rear axle housing.

A lug 173 projecting laterally outward from the edge of the bracket portion 162 of the bearing block 160 provides a base adapted to receive and hold one end of a compression spring 174 which bears against a suitable lug 175 formed on the trip bar 145 adjacent the trunnion 150 to hold the roller 144 yieldingly against the flanged clutch member 142 and to return the pedals 151 and 152 to their normal positions when released after being depressed.

What I claim is:

1. In combination with a tractor having a body provided with connecting means adapted to cooperate with complementary detachable implement connecting means, a power lift attachment including a housing, means adapted to cooperate with said tractor body connecting means for supporting said housing, power lift mechanism disposed within said housing, and detachable means for operatively connecting said power lift mechanism with the tractor driving means.

2. In combination with a tractor having a body including a transversely disposed rear axle housing provided with laterally spaced supports adapted to receive complementary detachable supports connected with implements interchangeably associated with said tractor and an engine driven power take-off shaft projecting from said tractor body for supplying rotative power to said associated implements, a unitary power lift attachment including means cooperative with said laterally spaced supports for detachably mounting said power lift attachment on said tractor, and a detachable driving connection between said power lift attachment and said power take-off shaft.

3. In combination with a tractor having a body including a transversely disposed rear axle casing provided with at least two laterally spaced implement mounting bosses and an engine driven power take-off shaft projecting rearwardly from said body, a power lift attachment for said tractor comprising a housing, mounting means for said housing adapted to cooperate with said implement mounting bosses for detachably supporting said power lift attachment on said tractor, power lift mechanism disposed within said housing, and detachable means for driving said power lift mechanism from said power take-off shaft.

4. In combination with a tractor having a rear axle housing and a power take-off shaft, a power lift attachment comprising a pair of laterally spaced bracket members adapted to be fixedly secured to said axle housing, a mechanism housing supported on said bracket members, a transverse rock shaft journaled in said mechanism housing, a transverse drive shaft journaled in said mechanism housing below and parallel to said rock shaft, a worm gear fixed on said drive shaft, a worm positioned in driving relation with said gear, self-interrupting clutch mechanism actuated by said drive shaft and operatively connected with said rock shaft to rock the latter, and driving connection between said power take-off shaft and said worm.

5. In combination with a tractor having a frame and a rearwardly extending power take-off shaft, a power lift attachment comprising a pair of laterally spaced bracket members fixedly attached to said frame, a housing supported on said brackets for swinging about a transverse axis, a rock shaft journaled in said housing, operating mechanism disposed within said housing for rocking said rock shaft, means for driving said operating mechanism from said power take-off shaft including a driving member fixed to said power take-off shaft and a driven member journaled in said housing for rotation about an axis parallel to said power take-off shaft, and means for aligning said driven member parallel to said power take-off shaft comprising an adjustable stop on said housing spaced vertically from said transverse axis and adapted to bear against the tractor frame to provide for angular adjustment of said housing relative to said power take-off shaft.

6. In combination with a tractor having a body including a rear axle housing provided with spaced connecting means adapted to cooperate with complementary connecting means of associated implements for detachably mounting the latter on said tractor body and an engine driven power take-off shaft projecting from said body and adapted to supply power to said associated implements, an attachment comprising a mechanism housing having mounting means adapted to cooperate with said axle housing connecting means, a drive shaft journaled in said mechanism housing, power lift mechanism disposed at one end of said drive shaft and operatively connected therewith, a power take-off driving member fixed to the other end of said drive shaft, and driving means operatively connecting said drive shaft with power take-off shaft.

7. In combination with a tractor having a transversely disposed rear axle housing provided with laterally spaced supports adapted to receive complementary detachable implement supports, a unitary power take-off attachment comprising a mechanism housing and a transverse power take-off shaft journaled therein, means cooperative with said laterally spaced supports for detachably mounting said power lift attachment on said tractor, and detachable means for operatively connecting the tractor driving means with said power take-off shaft to drive the latter.

8. In combination with a tractor having a transversely disposed rear axle housing provided with laterally spaced supports adapted to receive complementary detachable implement supports, and a rearwardly projecting engine driven power take-off shaft, a unitary power take-off attachment comprising a supporting structure, a transverse power take-off shaft journaled in said supporting structure, means cooperative with said laterally spaced supports for detachably mounting said attachment on said tractor, and a detachable driving connection between said transverse power take-off shaft and said rearwardly projecting tractor power take-off shaft.

9. In combination with a tractor having a power take-off shaft and a generally transverse rear axle housing provided with a pair of spaced implement mounting bosses adapted to cooperate with complementary detachable implement connecting means, a power lift attachment including a second housing having bracket members adapted to be fixed to said implement mounting bosses, a shaft journaled in said second housing, a pair of power lift units disposed at opposite ends of said shaft and operatively connected therewith, a worm gear fixed to said shaft, a worm disposed in driving relation with said worm gear, detachable means for driving said worm from said power take-off shaft, control means for operating each of said power lift units independently, and control means for operating both of said power lift units simultaneously.

10. In combination with a tractor having a rear axle housing provided with a pair of laterally spaced implement mounting bosses and an engine driven power take-off shaft, a unitary power lift attachment comprising a mechanism housing having a transverse tubular portion, a pair of bracket members adapted to be detachably fixed to said implement mounting bosses, means for supporting said mechanism housing on said bracket members, a shaft journaled in said transverse tubular portion, a pair of self-interrupting clutches disposed at opposite ends of said shaft and operatively connected therewith, power transmission means operatively connecting said shaft with said power take-off shaft, a pair of bell cranks supported on said bracket members for rocking about a transverse axis, link means connecting each of said clutches with its respective bell crank, and control means for operating said clutches independently or simultaneously at option.

11. The combination, with a tractor having a pair of power lift units of the type each comprising a driving member, a driven member, locking means for engaging said driving member with said driven member, and actuating means including a trip lever pivoted for swinging about a transverse axis and operatively engaged with said locking means, each of said trip levers having a forwardly extending portion adapted to be depressed, of control means for operating both of said actuating means simultaneously, said control means comprising a bail member pivoted for swinging about a transverse axis and having a transverse portion disposed above and resting upon the forwardly extending portions of both of said trip levers, whereby depressing said bail member depresses both of said trip levers simultaneously.

12. In combination with a tractor having a power take-off shaft and a generally transverse rear axle housing provided with spaced implement mounting means adapted to cooperate with complementary detachable implement connecting means, a power lift attachment including a second housing having bracket members adapted to be fixed to said implement mounting means, a shaft journaled in said second housing, a pair of clutch units disposed at opposite ends of said shaft and operatively connected therewith, said second housing having an enlarged section for housing drive gears, a worm gear in said enlarged section and fixed to said shaft, a worm disposed within said enlarged section and in mesh with said worm gear, and detachable driving means for driving said worm from said power take-off shaft.

13. A power lift attachment of the class described, comprising in combination, a housing including a pair of vertically spaced tubular portions rigidly interconnected by bracing members, means for supporting said housing on a tractor, a drive shaft journaled in one of said portions and a rock shaft journaled in the other of said portions, a driving gear mounted on said drive shaft, means for operatively connecting said gear with the tractor engine, self-interrupting clutch mechanism mounted on said drive shaft, and link means connecting said clutch mechanism with said rock shaft.

14. A power lift attachment of the class described, comprising in combination, a housing including a pair of vertically spaced tubular portions rigidly interconnected by bracing members, bracket means for supporting said housing on a tractor, a drive shaft journaled in one of said portions and a rock shaft journaled in the other of said portions, said drive shaft portion having an enlarged section for housing a drive gear, a drive gear in said drive gear section and fixed to said drive shaft adjacent one end of the latter, the opposite end of said drive shaft extending out of said tubular housing, self-interrupting clutch mechanism fixed to the extension of said drive shaft, link means connecting said clutch mechanism with said rock shaft, and means for operatively connecting said drive gear with the tractor engine.

15. A power lift device for use on a tractor, comprising in combination, a rock shaft, supporting means therefor including bearing means mounted on the tractor in which said rock shaft is journaled, an arm fixed to said rock shaft, engine driven lifting mechanism connected to said arm to actuate the rock shaft by power from the tractor engine, and means for supporting said lifting mechanism from said bearing means.

16. A power lift device for use on a tractor, comprising in combination, a rock shaft, supporting means therefor including bearing means mounted on the tractor in which said rock shaft is journaled, an arm fixed to said rock shaft, engine driven lifting mechanism disposed below said rock shaft and connected to said arm to actuate the rock shaft by power from the tractor engine, and means for swingably suspending said lifting mechanism from said bearing means.

17. In combination with a tractor, a power lift rock shaft, supporting means fixed to said tractor for rotatably supporting said rock shaft, an arm on said rock shaft, a lifting device disposed below said rock shaft and connected to said arm, power transmitting means operatively connecting said device with the tractor engine, and a supporting member attached to said lifting device and extending upwardly therefrom, the upper end of said member being attached to said rock shaft supporting means.

18. In combination with a tractor, a transversely disposed power lift rock shaft, supporting means therefor including a pair of laterally spaced brackets attached to the tractor, a lifting device disposed adjacent said rock shaft and connected thereto to rock the latter, power transmitting means for actuating said lifting device by power from the tractor engine, and supporting means for said lifting device connected between the latter and at least one of said brackets.

19. In combination with a tractor, a power lift rock shaft, supporting means therefor including at least one bracket detachably fixed to the tractor, an arm on said rock shaft, a lifting device disposed below said rock shaft and connected to said arm, power transmitting means connecting said device with the tractor engine, a supporting member attached to said lifting device, and means for attaching said supporting member to said bracket.

20. In combination with a tractor, a power lift rock shaft, supporting means therefor including at least one bracket detachably fixed to the tractor, an arm on said rock shaft, a lifting device disposed below said rock shaft and connected to said arm, power transmitting means connecting said device with the tractor engine, a supporting member attached to said lifting device, means for attaching the upper end of said member to said bracket, and means connected with said lifting device and reacting against the tractor during actuation of the lifting device.

21. In combination with a tractor, a power lift rock shaft, supporting means therefor including at least one bracket fixed to the tractor, an arm on said rock shaft, a lifting device connected to said arm, means supporting said lifting device on said bracket, and means for actuating said lifting device by power from the tractor engine including a flexible power transmitting member connecting said lifting device with a continuously rotating part on the tractor.

22. In combination with a tractor, a power lift rock shaft, supporting means therefor including at least one bracket detachably fixed to the tractor, a lifting device spaced from said rock shaft and operatively connected to rock the latter, supporting means attached to said lifting device and connected to said bracket, said lifting device being swingable relative to the tractor, and means for actuating said lifting device by power from the tractor engine including a detachable flexible power transmitting member connecting said lifting device with a continuously rotating part on the tractor.

THEOPHILUS BROWN.